(12) United States Patent
Ramon et al.

(10) Patent No.: US 9,993,742 B2
(45) Date of Patent: Jun. 12, 2018

(54) EVAPORATION ELEMENT AND PROCESS USING SAME

(71) Applicant: Lesico Technologies Ltd., Holon (IL)

(72) Inventors: Efraim Ramon, Be'er Ya'akov (IL); Jack Gilron, Beer Sheva (IL)

(73) Assignee: LESICO TECHNOLOGIES LTD., Holon (IL)

(*) Notice: Subject to any disclaimer, the term of this patent is extended or adjusted under 35 U.S.C. 154(b) by 391 days.

(21) Appl. No.: 14/835,639

(22) Filed: Aug. 25, 2015

(65) Prior Publication Data

US 2015/0367248 A1  Dec. 24, 2015

Related U.S. Application Data

(63) Continuation-in-part of application No. 13/509,768, filed as application No. PCT/IL2010/000946 on Nov. 16, 2010.

(30) Foreign Application Priority Data

Nov. 16, 2009 (IL) .......................................... 202169

(51) Int. Cl.
*B01D 1/24* (2006.01)
*B01D 1/22* (2006.01)
*C02F 1/08* (2006.01)

(52) U.S. Cl.
CPC ................. *B01D 1/24* (2013.01); *B01D 1/22* (2013.01); *B01D 1/221* (2013.01); *C02F 1/08* (2013.01)

(58) Field of Classification Search
CPC .. B01D 1/22; B01D 1/221; B01D 1/24; C02F 1/08

(Continued)

(56) References Cited

U.S. PATENT DOCUMENTS 1,056 A    12/1838  Harrison
1,775,036 A  9/1930  Dunning
(Continued)

FOREIGN PATENT DOCUMENTS

AU    2009100600    9/2009
CA    2237559       12/1998
(Continued)

OTHER PUBLICATIONS

AVIVAPURE—"ECUBE Brine Evaporation Accelerator Saves Money" http://www.avivapure.com/au/NEWS.aspx ; 6 pages; Accessed Sep. 4, 2014.

(Continued)

*Primary Examiner* — Jonathan Miller
(74) *Attorney, Agent, or Firm* — Dorsey & Whitney LLP

(57) ABSTRACT

A process for production of minerals using an evaporation unit comprising an evaporation element for exposing thereof to the atmosphere for evaporation of a liquid solution therefrom. The evaporation element comprises an evaporation surface and a texture for deflecting the solution during movement along the surface, leaving minerals on the surface as a result of evaporation of the solution. The texture allows the minerals to detach from the element under the sole influence of normal forces of nature before the minerals reach a weight capable of damaging the evaporation unit. The process includes wetting the element with the solution, which at least partially evaporates and forms precipitated minerals, at least some of which are left on the surface; and letting the minerals detach from the surface solely under the influence of normal forces of nature before the minerals on the surface reach a weight capable of damaging the unit.

20 Claims, 6 Drawing Sheets

(58) Field of Classification Search
USPC .................................................. 159/7, 32, 49
See application file for complete search history.

(56) References Cited

U.S. PATENT DOCUMENTS

| | | | |
|---|---|---|---|
| 2,843,536 | A | 7/1958 | Mount |
| 3,211,633 | A | 10/1965 | Hammer et al. |
| 3,282,797 | A | 9/1976 | Lapeyre |
| 3,980,527 | A | 9/1976 | Lapeyre |
| 3,992,246 | A | 11/1976 | Welch |
| 4,001,077 | A | 1/1977 | Kemper |
| 4,079,585 | A | 5/1978 | Helleur |
| 4,495,034 | A | 1/1985 | Lucas |
| 4,704,189 | A | 11/1987 | Assaf |
| 5,188,550 | A | 2/1993 | Oliver |
| 5,316,626 | A | 5/1994 | Guy |
| 6,000,684 | A | 12/1999 | Pasch et al. |
| 6,440,275 | B1 | 8/2002 | Domen |
| 6,500,216 | B1 | 12/2002 | Takayasu |
| 7,166,188 | B2 | 1/2007 | Kedem et al. |
| 8,088,257 | B2 | 1/2012 | Kemp |
| 8,580,085 | B2 | 11/2013 | Kemp |
| 2004/0141810 | A1 | 7/2004 | Lysne |
| 2012/0097341 | A1 | 4/2012 | Ramon |
| 2012/0247688 | A1 | 10/2012 | Gilron et al. |

FOREIGN PATENT DOCUMENTS

| | | |
|---|---|---|
| EP | 0034920 | 9/1981 |
| EP | 340482 | 11/1989 |
| ES | 2024097 | 2/1992 |
| GB | 2330779 | 5/1999 |
| WO | WO2007060530 | 5/2007 |
| WO | WO 2009/129572 | 10/2009 |

OTHER PUBLICATIONS

Belfer et al. "Modification of NF Membranes for Operation in Tertiary Wastewater Effluents" (2003); pp. 213-224.
Compass Minerals; "Solar Evaporation" http://www.compassminerals.com/products-services/production/solar-evaporation/ ; 1 page; accessed Sep. 11, 2014.
Gilron et al. "Environmentally acceptable technologies for ZLD of Coal Seam Gas water"; Presentation to Coal Seam Gas Conference, Jun. 2010, 34 pages.
Gilron et al. "WAIV—wind aided intensified evaporation for reduction of desalination brine volume" Desalination 158 (2003) 205-214.
International Search Report and Written Opinion from International Application No. PCT/IL2010/000946 dated May 18, 2011.
International Search Report from International Application No. PCT/IL2010/000517 dated Jan. 25, 2011.
"Industrial Minerals and Rocks: Commodities, Markets and Uses" by Jessica Elzea Kogel (Editor), Nikhil C. Trivedi (Editor), James M. Barker (Editor), Stanley T. Krukowsk (Editor); Publisher: Society for Mining Metallurgy & Exploration; 7 edition (Mar. 5, 2006), pp. 605-606 (relevant pages enclosed).
Katzir et al. "WAIV—Wind aided intensified evaporation for brine voume reduction and generating mineral byproducts" Desalination and Water Treatment; 13 (2010) 63-73.
SQM; "Production Process" http://www.sqm.com/en-us/acercadesqm/recursosnaturales/procesodeproduccion/caliche.aspx ; 2 pages; accessed Sep. 11, 2014.

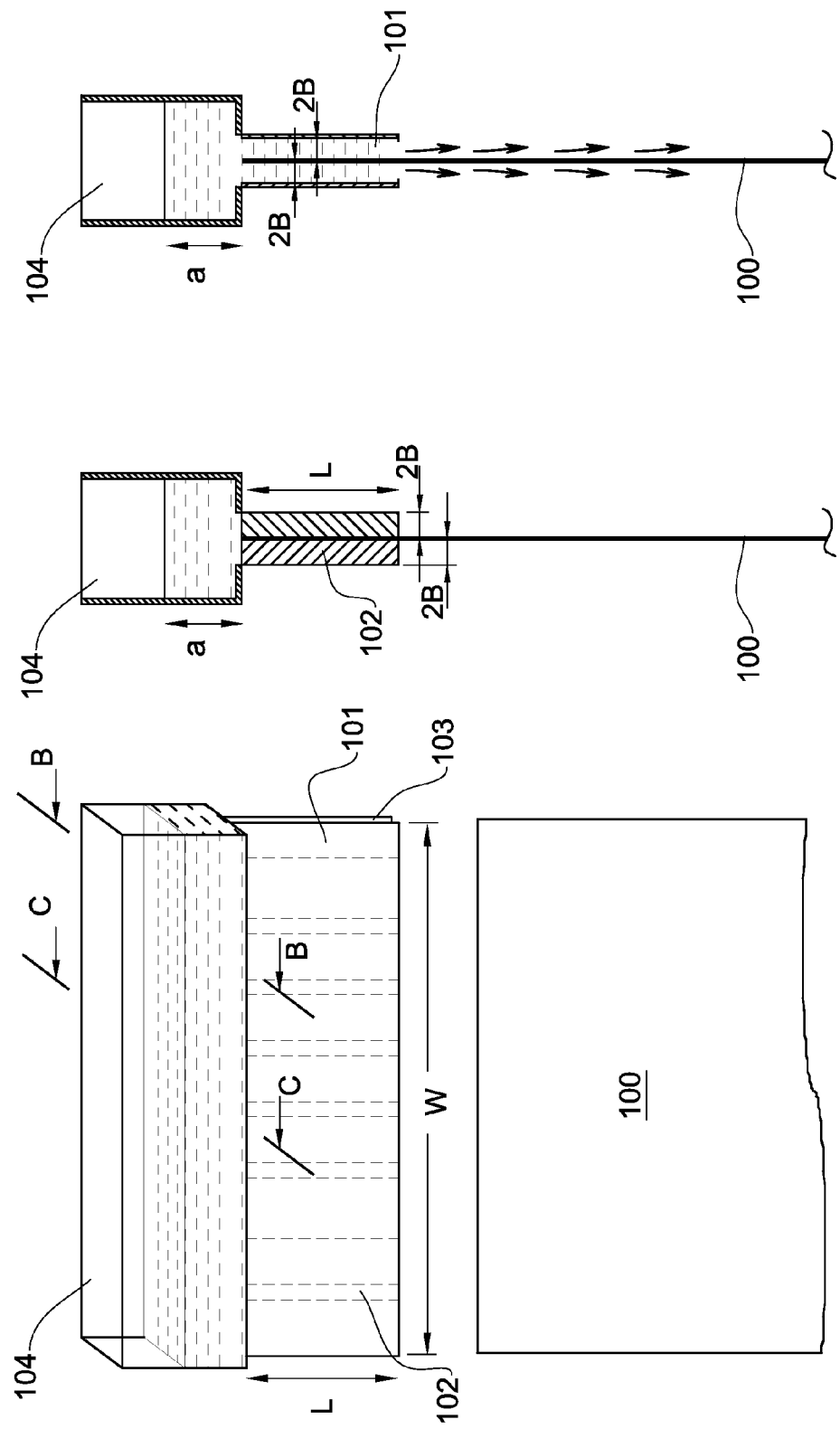

EVAPORATION ELEMENT AND PROCESS USING SAME

CROSS-REFERENCE TO RELATED APPLICATIONS

This application is a continuation-in-part of U.S. patent application Ser. No. 13/509,768 filed on 4 Jun. 2012, which is a U.S. nationalization of PCT/IL2010/000946 filed on 16 Nov. 2010, which claims priority to Israel Patent Application No. 202169 filed on 16 Nov. 2009, the disclosure of each of the foregoing applications is incorporated herein, in its entirety, by this reference.

FIELD

The subject matter of the present application relates to evaporation elements for exposing thereof to the atmosphere to increase the rate of evaporation of a liquid solution, and to a process of producing minerals from using said evaporation element.

BACKGROUND

Evaporation elements can be used to evaporate liquid from liquid sources.

An example liquid source is an outdoor pond where wastewater is stored and where evaporation is needed to concentrate the waste for further treatment.

Another use of evaporation elements can be for the production of minerals, by having the minerals precipitate out of a liquid solution in a solid phase.

For the purpose of the specification and claims, the word 'minerals' below means "minerals in a solid phase".

Examples of evaporation elements and evaporation units are described in U.S. Pat. No. 7,166,188.

SUMMARY

It has been found that when an evaporation element made of a porous material is wetted with a liquid solution, solid phase minerals which precipitated on evaporation of the liquid solution can penetrate pores of the evaporation element and form solid deposits therein, and can extend across the thickness of the evaporation element. The solid deposits can become anchored to the evaporation element via the pores. The solid deposits can increase in size until they reach a weight which can cause damage to parts of evaporation unit, such as the evaporation element thereof, a support structure of the evaporation unit which holds the evaporation element, or an element connecting the evaporation unit to the evaporation element.

In accordance with a first aspect of the subject matter of the present application, there is provided an evaporation unit comprising an evaporation element for exposing thereof to the atmosphere for evaporation of a liquid solution therefrom, the evaporation element comprising an evaporation surface oriented for allowing movement of said liquid solution therealong under the influence of gravity, and having a texture configured for deflecting the liquid solution during said movement along the evaporation surface, leaving minerals on said surface produced as a result of evaporation of the liquid solution, and further configured for allowing said minerals to detach from the evaporation element under the sole influence of normal forces of nature before the minerals on said element reach a weight capable of damaging the evaporation unit.

It will be understood that the evaporation unit can be configured for use in an enclosed structure, such as a building. In such case, the atmosphere which the evaporation element is for exposure thereto is the atmosphere inside the building.

Alternatively, the evaporation unit can be configured for outdoor use. In such case, the atmosphere which the evaporation element is for exposure thereto can include wind.

The evaporation unit can be configured to suspend the evaporation element above the ground in a desired orientation. The orientation of the evaporation surface can be vertical. The orientation of the evaporation element can slanted with respect to an imaginary vertical axis. The angle of slant can be between 0 to 30 degrees from the imaginary vertical axis.

It will be understood that such orientation can facilitate movement of movement of the liquid solution along the evaporation surface.

The texture of the evaporation surface is configured for deflecting the liquid solution to increase the amount of surface area of the evaporation surface which the liquid solution contacts. In other words, the texture is configured to spread the liquid solution on the evaporation surface. This can increase the efficiency of the evaporation unit.

The texture of the evaporation surface can be configured for deflecting the liquid solution during said movement along the evaporation surface, by comprising any of the following features:

The texture of the surface can be rough or irregular (e.g. scratched).

The texture can comprise pattern. The pattern can be a random pattern.

The pattern can extend in a horizontal direction. The pattern can include at least one projection having an elongated portion horizontally extending along and engaging the evaporation surface.

The evaporation surface can be wettable by liquid. When the evaporation surface is exposed to the atmosphere when wetted, evaporation of the liquid from the evaporation surface can occur.

The evaporation surface can be configured to be wettable by adsorbing a hydrophilic polymer to the surface.

The evaporation surface can be configured to be wettable by chemically grafting hydrophilic groups on the surface by various grafting methods including but not limited to redox grafting, plasma radical generated grafting, UV generated grafting, or by generating a sheet which is coated with from a suspension of hydrophilic particles of sufficient concentration to leave a coating of said particles on the evaporation surface.

The evaporation surface can be hydrophilic. The evaporation surface can be hydrophilic due to the material of the evaporation element being hydrophilic. In such case the material is hydrophilic before the evaporation element is formed. Alternatively, the evaporation element can be multi-layered. In the case of a multi-layer, the evaporation surface can be hydrophilic due to an outer layer thereof, constituting the evaporation surface, being hydrophilic. In such case an inner or inner layers of the evaporation element may made of a non-hydrophilic base material, and the base material can be coated with a hydrophilic coating or chemically treated to make the evaporation surface thereof hydrophilic. For the purposes of the specification and claims an evaporation surface is considered to be hydrophilic if a drop of water placed on the surface makes a nominal contact angle of 70 degrees or less.

The texture of the surface can comprise projections extending in a direction away from the surface. The outwardly extending projections can be perpendicular deviations from an imaginary ideal planar surface of the evaporation element. The perpendicular deviations can extend a distance of at least 0.2 mm from the imaginary ideal planar surface. The perpendicular deviations can extend a distance of up to 6 mm from the imaginary ideal planar surface. The perpendicular deviations can extend in a direction away from the ideal planar surface. In such case the perpendicular deviations extend above the ideal planar surface. The deviations can have a regular or irregular form. The deviations can extend in a horizontal direction. The deviations can extend in a vertical direction. The projections can have a length parallel with the ideal planar surface of between 0.1 to 50 mm. The projections can have a length parallel with the ideal planar surface of 5 cm or more. The projections can project a length of from the ideal planar surface. The projections can deviate between 0.2 mm to 6 mm above an imaginary ideal planar surface of the evaporation element. The projections can be formed in the production of the surface by impressing a pattern on the evaporation element (which can, for example, be made of plastic material). The projections can be formed by thereof into the evaporation element. The projection can be made from the same or a different material than the evaporation element or evaporation surface.

As an alternative, or in addition to, the projections, the texture of the surface can be formed with grooves. The grooves can have any of the features stated above with respect to the projections, mutatis mutandis.

The evaporation surface can be formed with a corrugated shape.

The evaporation surface can be formed with facets.

A possible advantage of an evaporation surface having such texture may be that it obstructs motion of liquid thereacross, preventing movement of the liquid along the shortest path down the evaporation surface, when moved under the influence of gravity. Such obstruction can cause liquid moving across the surface to spread across a greater surface area of the surface. This can be via splitting a liquid solution flow path of the liquid solution moving across the evaporation surface into multiple paths. Consequently a larger area of the evaporation surface can be wetted.

It will be understood that when it is stated that the texture of the evaporation surface is configured for allowing the minerals to detach from the evaporation element under the sole influence of normal forces of nature, this means that the minerals detach without active physical removal thereof, such as by a human or machine.

Example forces of nature are gravity and wind.

Without being bound to theory, when minerals are attached to an evaporation element, for example after having accumulated in a pore and on an adjacent portion of an evaporation surface anchored to the pore, the increasing weight of the continuously accumulating solid on the evaporation surface eventually exceeds the tensile strength of the solid mineral causing the portion of the solid on the evaporation surface to detach from the portion of the solid in the pore and fall due to gravitational force. Such detachment can also occur, when the minerals are brittle, to the combination of the brittleness of the minerals and the moment of the minerals about the edge of the pore, together with gravitational force.

In a case where the evaporation surface is free of pores, when the minerals accumulate to a certain weight, gravitational forces may simply cause the minerals to fall from the evaporation element.

It will be understood that such detachment may be assisted by wind forces. Wind forces applied to the evaporation element may cause motion thereof, and can even cause the element to flex, which can detach minerals connected thereto.

Notably, different minerals may have different tensile strengths. Consequently, the detachment mentioned above may occur at different weights for different minerals.

It will be understood that 'normal' forces of nature, excludes rare environmental conditions such as cyclones, earthquakes, floods, and even slightly abnormal conditions, such as wind forces deviating to an unexpectedly high level. It will be understood that the subject matter of the present invention is for continuous operation under normal environmental conditions, and the features thereof are configured for these conditions. For example, the evaporation element and/or evaporation unit can be designed for winds of up to 60 km per hour.

The texture of the evaporation surface can be configured for allowing said minerals to detach from the evaporation element under the sole influence of normal forces of nature before the minerals on said element reach a weight capable of damaging the evaporation unit, by being free of an anchoring configuration.

Such anchoring configuration can be a configuration allowing solids formed on the evaporation surface to anchor to the evaporation element in a manner that they cannot be detached without active physical removal thereof, such as by a human or machine.

In some cases anchoring configurations can be configurations allowing a strong anchoring of minerals to the evaporation element, wherein mere shaking of the evaporation element will typically not be sufficient to remove solids anchored thereto and tools may be required to mechanically remove the solids.

Such anchoring configuration can be in the form of depressions extending from the evaporation surface into interior of the evaporation element, which have within the interior a larger linear dimension parallel to the evaporation surface than their corresponding dimension at the evaporation surface.

Examples of evaporation surfaces being free of anchoring configurations can include evaporation surfaces having any of the following features:

completely free of pores;

a majority thereof free of pores;

formed only with pores which are spaced at least 10 cm apart from each other (Without being bound to theory, it is believed that a plurality of pores located closer than 10 cm to each other increases the attachment strength of minerals formed thereon to a degree to an unacceptable level, i.e. preventing detachment thereof by normal forces of nature);

free of any of the types, or arrangement, of pores mentioned above, and having a pore depth extending perpendicular from the evaporation surface greater than 1 cm;

free of any of the types, or arrangement, of pores mentioned above, which allow anchoring of accumulated solids of a weight greater than 20 kg per square meter, per evaporation surface;

free of any of the types, or arrangement, of pores mentioned above, the pores being formed with a neck portion having a first end formed at the evaporation surface and a second end engaging an expansion portion, the expansion portion having a cross-sectional area greater than the neck portion;

free of any of the types, or arrangement, of pores mentioned above, the pores being formed with undercuts, i.e. recesses which have an opening at the surface of the evaporation element which are smaller than a portion of the recess further inside the evaporation element;

free of any of the types, or arrangement, of pores mentioned above, the pores being through holes, i.e. extending from one evaporation surface of the evaporation element to another portion of an evaporation surface of the evaporation element;

the evaporation element may be impermeable;

the evaporation element may be configured to prevent fluid therethrough;

It has been found that when an evaporation element is configured for allowing minerals to detach therefrom, as described above, is wetted, it can result in the evaporation element being more free of precipitation of solids than a similar porous evaporation element, without affecting the relative evaporation rate thereof. This is surprising since an evaporation element having any the features described above can comprise a comparatively smaller evaporation surface area than a porous element of similar dimensions. To elaborate, an evaporation element which is free of an anchoring configuration, for example which is made of fiberglass, can yield better evaporation results than an element of similar dimensions made of a porous materials such as porous fabric, volcanic rock (tuff), ceramic rings, Berl saddles, or fill materials used in gas liquid contactors.

A possible advantage of the use of an evaporation element having such configuration for detachment, can be that an evaporation unit comprising the evaporation element, may not be burdened with excessive weight caused by minerals in the form of solid deposits accumulating thereon. Such evaporation unit can possibly be designed and built with comparatively less material and can therefore be comparatively cheaper than a similar unit designed to bear a heavier load.

The surface of the evaporation element and/or the evaporation element can be made of a material selected from polyolefins (high density polyethylene or polypropylene), halogenated aliphatics (PVDF or PVC), polyacetate, ABS, PPO, fiberglass, Polyether ether ketone (PEEK) and nylon. The surface of the evaporation element and/or the evaporation element can be made of a material having similar properties to those listed.

The materials listed each can be advantageous, depending on design criteria, for example:

polyolefins can have good mechanical strength;

halogenated aliphatics can have good strength and chemical stability;

PVDF can be more heat resistance than polyolefins;

ABS is a copolymer of acrylonitrile, butadiene and styrene monomers, which can be formed into sheets and can be mechanically stronger than HDPE;

PPO (Noryl Polyphenylene oxide) is a polyphenylene oxide-styrene copolymer, which can be stronger than HDPE; PPO can have increased strength when it is 30% glass-filled.

Materials such as polyolefins, fiberglass, halogenated aliphatics, nylon, ABS and PPO may require hydrophilization. Polyacetate may not require hydrophilization.

Nylon, fiberglass and polyacetate would typically be used where the liquid solution is not acidic.

The evaporation element can be made of any material that will withstand shear forces applied by wind thereto.

The evaporation element can be formed with a sheet-like shape.

The evaporation element can be formed with two evaporation surfaces.

The evaporation element can be formed with a corrugated shape.

It will be appreciated that the evaporation element can be any desired shape.

The evaporation element can be formed, for a particular application, with a thickness dimension of between about 0.25 mm to 5 mm. For other applications the thickness dimension can be between about 5 mm to 20 mm. For other applications the thickness dimension can be between about 20 mm to 4 cm.

The evaporation element can be flexible.

In accordance with another aspect of the subject matter of the present application, there is provided an evaporation unit comprising an evaporation element having any of the features above.

Stated differently, an evaporation element having any of the features above can be part of an evaporation unit.

The evaporation unit can be configured to suspend the evaporation element above a body of liquid or above a bank adjacent to a body of liquid.

The evaporation unit can be configured to project liquid on the evaporation surface via a distribution conduit disposed near the evaporation element. In a case where the evaporation element has at least two evaporation surfaces, the evaporation unit can be configured to wet the at least two evaporation surfaces thereof. For example, each surface can be wetted by a different distribution conduit or a single conduit can be configured with apertures oriented in different directions to reach more than one desired surface.

The evaporation unit can be constructed of the evaporation elements. The evaporation element or evaporation elements can be structural parts or building blocks of the evaporation unit. In such case the evaporation elements may be rigid. The evaporation elements may be configured to bear the load of other evaporation elements.

The evaporation unit can be configured to distribute liquid including highly saturated mineral brines. Alternatively, the evaporation unit can be configured, for example, to distribute liquid including acid, for the purpose of increasing the concentration of the acid.

In accordance with still another aspect of the subject matter of the present application, there is also provided a method of manufacture of an evaporation unit comprising an evaporation element having any of the features described above.

The method can include assembling the evaporation unit using the evaporation element as a structural part thereof.

The method can include supporting one evaporation element with another.

The method can include holding one evaporation element in a predetermined position with another.

According to any of the aspects above, the evaporation element or unit can be used for:

brine volume reduction of highly saturated mineral brines (examples of highly saturated mineral brines can be those comprised of chlorides of sodium, potassium, calcium and magnesium);

increasing the concentration of an acid;

mineral production, wherein the mineral precipitated is collected;

removal as a precipitate of a so-called contaminating mineral (e.g. sodium chloride) to allow a desirable mineral to be economically isolated and extracted in the plant;

production of desired minerals (such as sodium chloride, magnesium chloride, potassium sulfate, boric acid, potassium chloride, potassium sulfate, lithium salts, lithium carbonate, lithium hydroxide, potash, sodium carbonate) using one of the options above; and collection of minerals.

In accordance with still a further aspect of the subject matter of the present application, there is provided an evaporation element for use with an evaporation unit configured for using wind to increase the rate of evaporation of liquid from an liquid source, the evaporation element being formed with an evaporation surface having a rough texture, and being made of a material having a majority thereof being free of pores having an anchoring configuration.

The evaporation element can have any of the features defined above in connection with the other aspects.

In accordance with yet another aspect of the subject matter of the present application, there is provided a process for production of minerals using an evaporation unit comprising an evaporation element for exposing thereof to the atmosphere for evaporation of a liquid solution therefrom, the evaporation element comprising an evaporation surface oriented for allowing movement of said liquid solution therealong under the influence of gravity, and having a texture configured for deflecting the liquid solution during said movement along the evaporation surface, leaving minerals on said surface produced as a result of evaporation of the liquid solution, and further configured for allowing said minerals to detach from the evaporation element under the sole influence of normal forces of nature before the minerals on said element reach a weight capable of damaging the evaporation unit, the process including:
  a) wetting the evaporation element with the liquid solution, which at least partially evaporates and forms precipitated minerals, at least some of which are left on said evaporation surface; and
  b) letting said minerals detach from said evaporation surface solely under the influence of normal forces of nature before the minerals on said evaporation surface reach a weight capable of damaging the unit.

The process can comprise a further step of collecting at least some of said precipitated minerals.

The collecting can include collecting any precipitated minerals which have detached from the evaporation surface.

The collecting can include collecting any precipitated minerals which were not left on the evaporation surface (i.e. which were not left on the surface).

The further step of collecting can include collecting all precipitated minerals.

The process can comprise a further step of collecting liquid solution which has not evaporated. In such case the minerals precipitated from the liquid solution which are left on the evaporation surface can be so-called contaminating minerals and merely their removal was desired so that the remainder of the liquid solution could be collected. Alternatively, such precipitated minerals can also be valuable. In such case the step of collecting can include collecting both the precipitated minerals and the liquid solution which has not evaporated.

The process can comprise a further step of collecting at least some of said precipitated minerals and/or liquid solution which has not evaporated.

The step of collecting can further include collecting any precipitated minerals which are in the liquid solution which has not evaporated.

The step of collecting can include collecting both the precipitated minerals which have and have not detached from the evaporation surface.

The evaporation element or evaporation unit can have any of the features defined above in connection with the other aspects.

In accordance with a further aspect of the subject matter of the present application, there is provided an evaporation unit comprising an evaporation element for exposing thereof to the atmosphere for evaporation of a liquid solution therefrom, the evaporation element comprising an evaporation surface oriented for allowing movement of said liquid solution therealong under the influence of gravity, and having a texture configured for deflecting the liquid solution during said movement along the evaporation surface, leaving minerals on said surface produced as a result of evaporation of the liquid solution, the evaporation surface can be made of a material selected from polyolefins (high density polyethylene or polypropylene), halogenated aliphatics (PVDF or PVC), polyacetate, ABS, PPO, fiberglass, PEEK and nylon.

The evaporation element can have any of the features defined above in connection with the other aspects.

In accordance with yet another aspect of the subject matter of the present application, there is provided a process for production of minerals using an evaporation unit comprising an evaporation element for exposing thereof to the atmosphere for evaporation of a liquid solution therefrom, the evaporation element comprising an evaporation surface oriented for allowing movement of said liquid solution therealong under the influence of gravity, and having a texture configured for deflecting the liquid solution during said movement along the evaporation surface, leaving minerals on said surface produced as a result of evaporation of the liquid solution, the evaporation surface can be made of a material selected from polyolefins (high density polyethylene or polypropylene), halogenated aliphatics (PVDF or PVC), polyacetate, ABS, PPO, fiberglass, PEEK and nylon, the process including:
  c) wetting the evaporation element with the liquid solution, which at least partially evaporates and forms precipitated minerals, at least some of which are left on said evaporation surface; and
  d) letting said minerals detach from said evaporation surface solely under the influence of normal forces of nature before the minerals on said evaporation surface reach a weight capable of damaging the unit.

The evaporation element or evaporation unit can have any of the features defined above in connection with the other aspects.

BRIEF DESCRIPTION OF THE DRAWINGS

In order to understand the subject matter of the present application and to see how it may be carried out in practice, embodiments will now be described, by way of non-limiting example only, with reference to the accompanying drawings, in which:

FIG. 10A illustrate a different evaporation unit;

FIGS. 10B and 10C are cross-sectional views of the evaporation unit of FIG. 10A taken along the respective planes B-B and C-C in FIG. 10A.

DETAILED DESCRIPTION

In a comparative experiment, two evaporation elements were prepared, one a porous netting and the other a fiberglass board.

The fiberglass board was prepared using a redox pair of potassium persulfate/potassium metabisulfite to generate radicals, using Hydroxyethylmethacrylate (HEMA) as a hydrophilic monomer to be grafted onto a surface of the fiberglass board by in-situ grafting.

After one hour of exposure to the reaction mixture, the surface of the fiberglass board was shown to be hydrophilic by inspection as water spread thereon instead of beading up as normally occurs with a similar board which has not undergone the treatment above.

The evaporation elements were mounted in a lab-scale outdoor evaporation unit. The evaporation unit was fed with a mineral brine containing 25-28% total dissolved solids (TDS) including mixed chlorides, and operated for over one month.

At the end of the time of operation, it was seen that solids deposited on the fiberglass board detached and fell away from the surface thereof solely due to gravitational forces. The solids deposited on the porous netting did not detach from the surface thereof.

Figure 2:
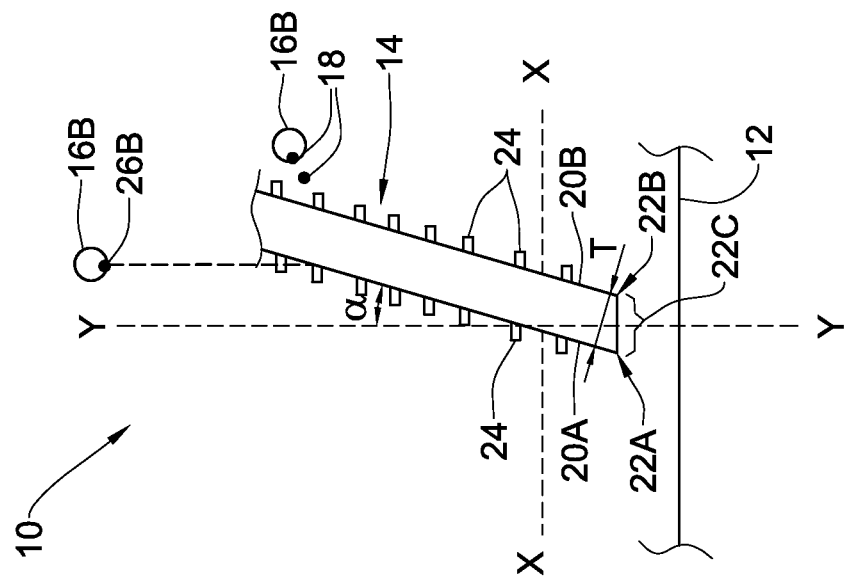
FIG. 2 is a schematic side view of the portion of the evaporation unit in FIG. 1.
Figure 1:
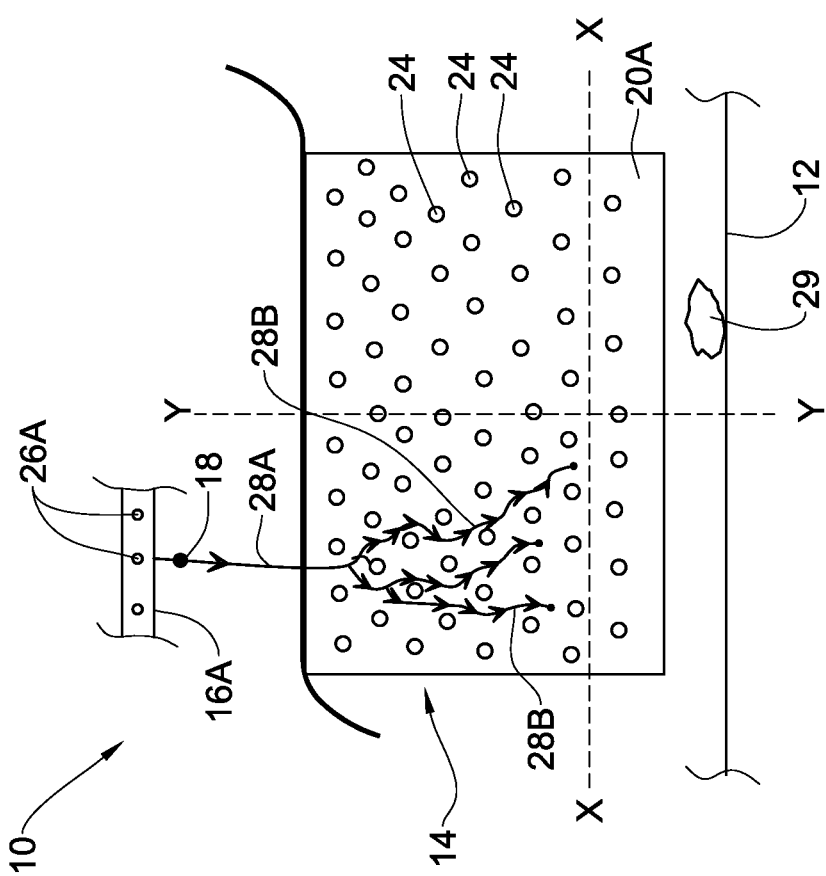
FIG. 1 is a schematic front view of a portion of an evaporation unit.

Referring now to the drawings wherein like reference characters designate like or corresponding parts throughout several views, there is shown in FIGS. 1 and 2, a portion of an evaporation unit, generally designated by the numeral 10, for increasing evaporation from a surface of a body of liquid (not shown). To aid understanding, an imaginary horizontal plane X and an imaginary vertical axis Y, are shown. The liquid source in the present example is a brine reservoir, and thus the evaporation unit 10 is used for brine volume reduction of highly saturated mineral brines.

The evaporation unit 10 is mounted above a horizontal surface 12 of a bank adjacent the body of liquid.

It will be understood that the evaporation unit can also be mounted directly above a body of liquid (not shown).

The evaporation unit 10 comprises, and suspends above the surface 12, an evaporation element, generally designated as 14, and a fluid distribution system including pipes (16A, 16B) for wetting the evaporation element 14 with fluid 18 from the body of liquid. In the present example the evaporation unit 10 holds the evaporation element 14 in an orientation slightly slanted with respect to a vertical axis, as indicated by an acute angle σ.

The angle σ can be between 0 to 30 degrees from the imaginary vertical axis Y, and in this case is 30 degrees.

The evaporation element 14 is formed with a sheet-like shape having two opposite evaporation surfaces (20A, 20B).

The evaporation element 14 comprises three layers, a first outer layer 22A, a second outer layer 22B and a central layer 22C extending between the first and second outer layers (22A, 22B). A thickness of the evaporation element 14, including the three layers (22A, 22b, 22C) is designated as T.

The first outer layer 22A constitutes one of the evaporation surfaces 20A, and the second outer layer 22B constitutes the other evaporation surfaces 20B.

In the present example the central layer 22C is made of fiberglass.

It will be appreciated that the evaporation element, or the central layer thereof, can be made of high density polyethylene sheet with or without reinforcement, PVC, or any other polymer with sufficient mechanical strength to maintain the form of a sheet.

The outer layers (22A, 22B) constituting the evaporation surfaces (20A, 20B) are each hydrophilic coatings on the central layer 22C.

The evaporation surfaces (20A, 20B) are formed with horizontal elements (24) projecting horizontally outwardly therefrom and arranged in a regular pattern.

The pipes (16A, 16B) are formed with apertures (26A, 26B) configured to project liquid 18 on the evaporation surfaces (20A, 20B) drawn using pumps (not shown) from the body of liquid (not shown).

During operation, the liquid 18 seeps out of the apertures (26A, 26B) of the pipes (16A, 16B) and falls by gravity on the evaporation surfaces (20A, 20B).

As can be seen in FIG. 1, the texture of the evaporation surface 20A, which includes the horizontal elements 24, causes the liquid 16 to diverge from a single liquid path 28A into a plurality of liquid paths 28B, forcing the liquid to move sideways as well as downwards. The plurality of liquid paths 28B, each being non-linear due to repeated sideways deflection of the liquid moving along the evaporation surface caused by the presence of the horizontal elements 24.

The liquid on the evaporation surfaces (20A, 20B) is also exposed to wind (not shown) causing evaporation thereof.

Minerals 29 produced by evaporation of the liquid 18, fall to the horizontal surface 12 of the bank, as a result of gravitational and wind forces thereon.

Figure 3:
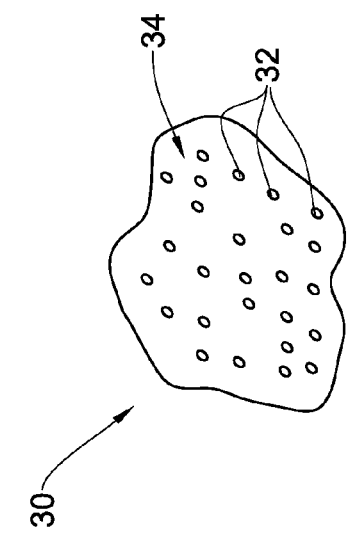
FIG. 3 is a schematic front view of a portion of another evaporation element.

Referring now to FIG. 3, it will be appreciated that divergence of a liquid path into multiple paths (not shown) can also be caused by use of an evaporation element, generally designated as 30, comprising a random pattern of elements 32 projecting from an evaporation surface 34 thereof.

Figure 4:
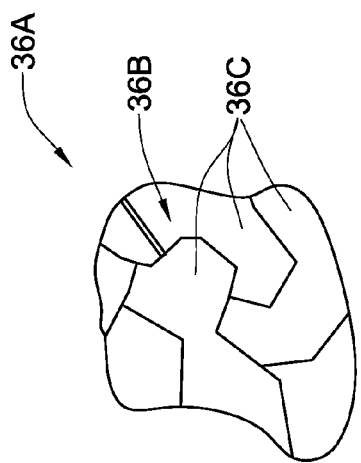
FIG. 4 is a schematic front view of a portion of yet another evaporation element.
Figure 6:
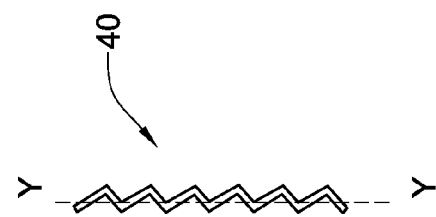
FIG. 6 is a schematic side view a further evaporation element.
Figure 5:
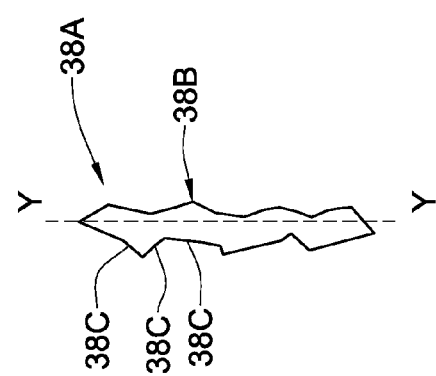
FIG. 5 is a schematic side view of still another evaporation element.

Other examples of evaporation elements having a suitable texture are shown in FIGS. 4 to 6. FIGS. 4 and 5 illustrating evaporation elements (36A, 38A) which have evaporation surfaces (36B, 38B) formed with differently oriented facets (36C, 38C), and FIG. 6, illustrates an evaporation element 40A formed with a corrugated shape.

Evaporation elements such as those described above and below may be used with evaporation units such as those described in U.S. Pat. No. 7,166,188, the detailed description of which, as far as the use of the evaporation units is concerned, is incorporated herein by reference.

Figure 7A:
FIG. 7A is a schematic front view a further evaporation element.
Figure 7B:
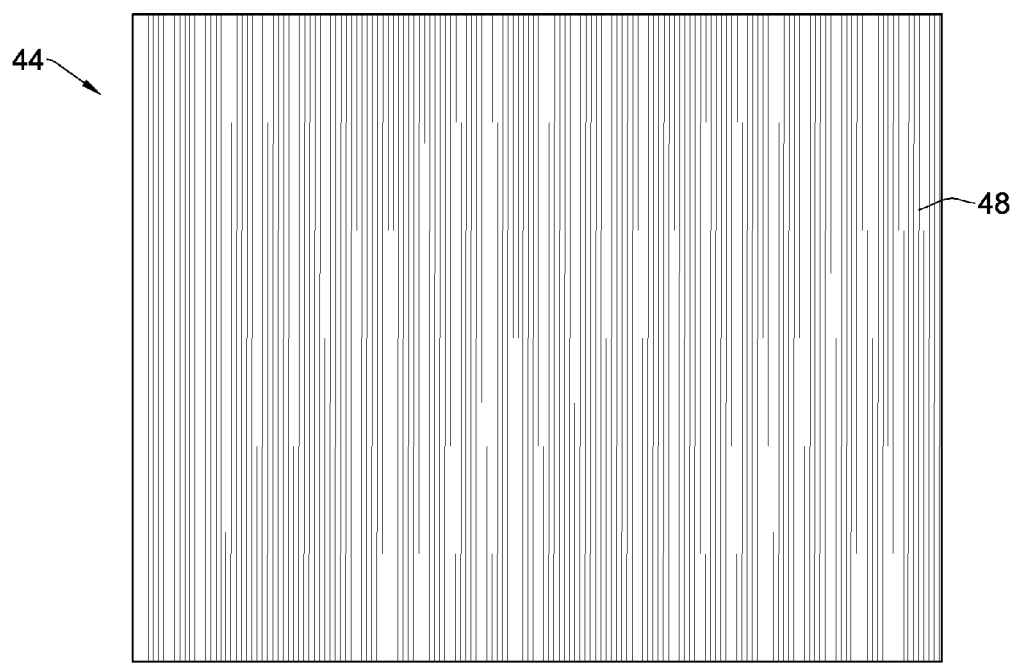
FIG. 7B is a schematic front view of yet a further evaporation element.

Referring FIGS. 7A and 7B, there is shown further examples of evaporation elements (42, 44). Evaporation element 42 differs from evaporation element 44, in that it comprises projections following a horizontal pattern. That is to say that it is formed with a plurality of horizontal ribs 46. By contrast, evaporation element 44 is formed with vertical ribs 48.

It is believed that the evaporation element 42 can have greater efficiency as it further obstructs or at least lengthens the downward flow path of liquid solution thereon.

Figure 8:
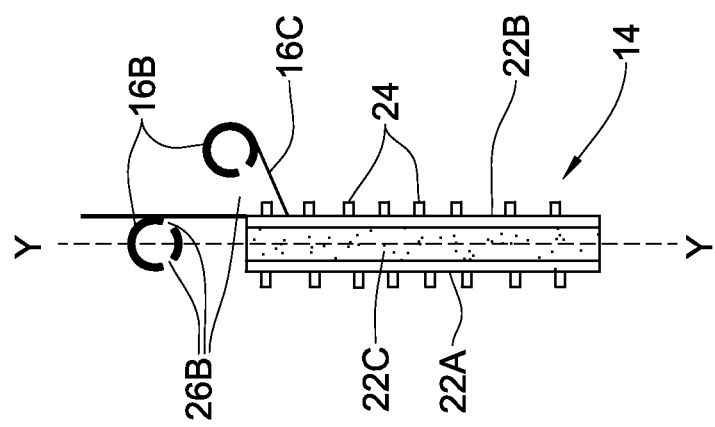
FIG. 8 is a schematic side view of a portion of another evaporation unit.

FIG. 8 shows a portion of an evaporation unit, similar to the evaporation unit shown in FIGS. 1 and 2. Notable differences are that the evaporation element 14 is parallel with the imaginary vertical axis Y, a distribution pipe 16B is disposed directly above the evaporation element 14, and one of the distribution pipes is connected by a netting or fabric (16C) that guides movement of liquid solution from the apertures (26A, 26B) down to the evaporation element 14.

It will be understood that each of the notable differences mentioned above are only shown in a single figure for the purposes of convenience, and that an evaporation unit may have a distribution pipe at any convenient location, such netting or fabric is optional and that the orientation of an evaporation element can be chosen per the design criteria for a given application.

Figure 9:
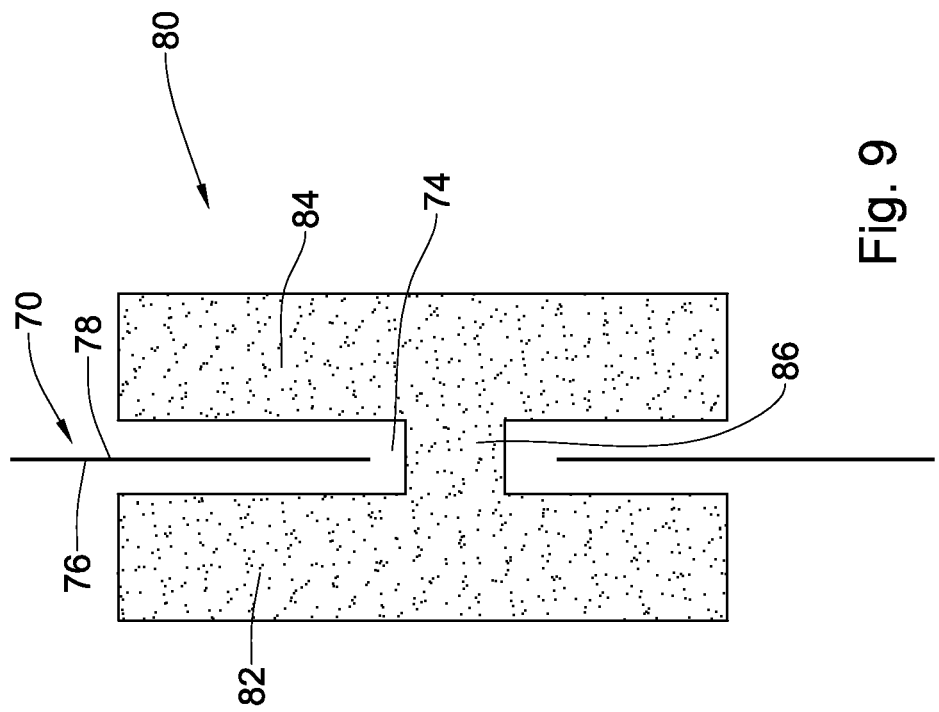
FIG. 9 is a schematic side view of a portion of an evaporation element with a solid deposit anchored thereto.

For the purpose of understanding anchorage of minerals to evaporation elements, drawing attention to FIG. 9, there is shown an example of a portion of an evaporation element 70, formed with a pore 74 (through hole) extending from a first evaporation surface 76 to an opposite evaporation surface 78 thereof. Also shown is a mineral solid deposit 80 which has accumulated on the evaporation element 70 and is anchored thereto the via the pore 74. The solid deposit 80 comprises a first portion 82 adjacent the first evaporation surface 76, a second portion 84 adjacent the other evaporation surface 78, and a bridging portion 86 extending through the pore 74 and connecting the first and second portions (82, 84).

As in the present example, the evaporation element 70 is flexible, wind forces applied to thereto cause the evaporation element 70 to bend, which can break the typically brittle solid deposit 80, at the bridging portion 86 thereof, causing the first and second portions (82,84) to fall from the evaporation element 70.

However, if there were additional pores (not shown) disposed in close proximity to pore 74 (e.g. less than 10 cm distance between them), additional bridging portions connecting the first and second portions (82,84) could be present, reinforcing the connection therebetween such that even when the evaporation element 70 is bent by normal wind forces the bridging portions would be able to maintain connection between the first and second portions (82,84), preventing their detachment from the evaporation element 70.

Similarly, the detachment of a mineral solid deposit from the pore 74 would be prevented if the pore would have within the interior of the evaporation element a larger linear dimension parallel to the evaporation surface than its dimension at the evaporation surface.

FIGS. 10A to 10C illustrate an example of an evaporation unit comprising an evaporation element and a feed trough rather than a pipe as shown in FIGS. 1 and 2, for containing a mineral solution to be used for wetting the evaporation element.

Figure 11:
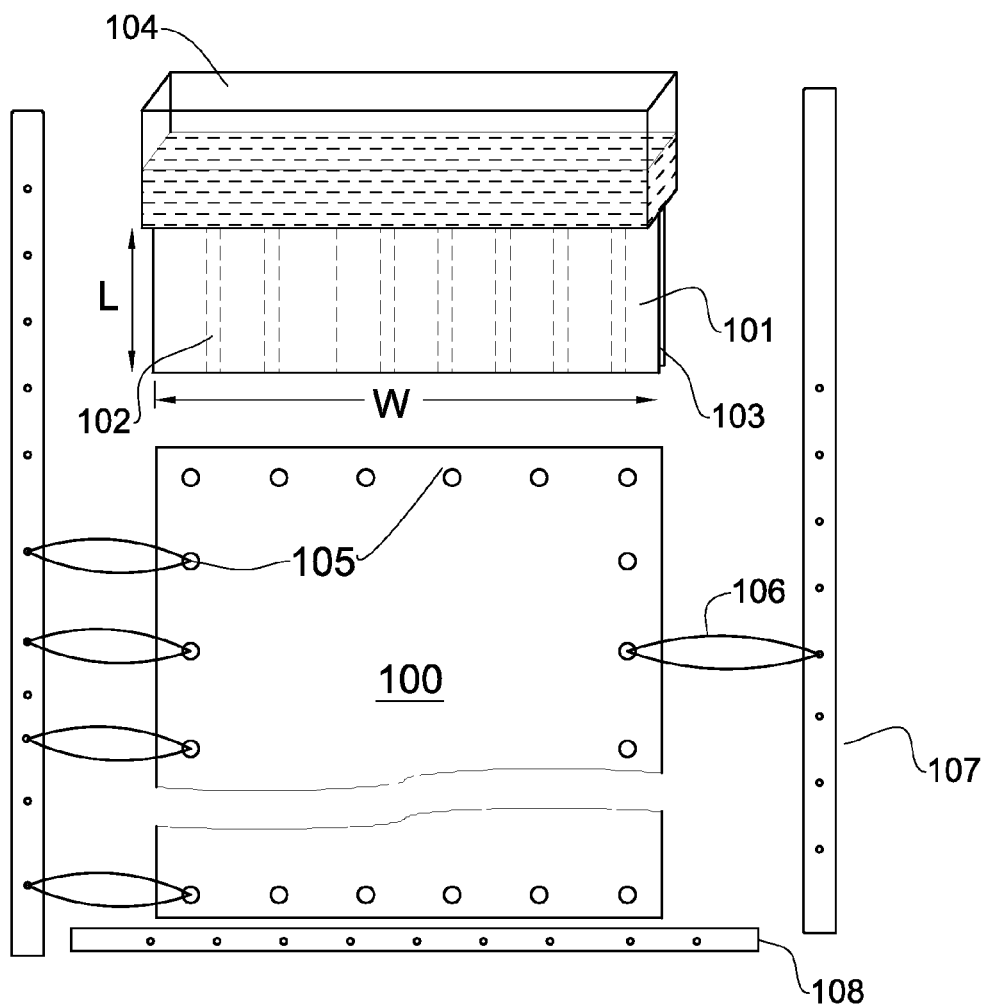
FIG. 11 illustrate the manner in which the evaporation element of the evaporation unit of FIG. 10 can be held.

In particular, FIGS. 10A to 11 show such evaporation unit including an evaporation element 100 in the form of a thin sheet made of any material as described above or any other suitable material, and a feed trough 104 containing a mineral solution and formed with a slit 101, which is in fluid communication with the interior of the feed trough 104. The slit 101 is configured for receiving therein an upper portion of the evaporation element 100 so as to provide a steady flow of the mineral solution over each evaporation surface of the evaporation element 100 disposed below the slit 101, by the force of gravity that generates a pressure head due to the height of the mineral solution above the slit 101.

As illustrated in FIG. 10C, a flow channel obtained on each side of the evaporation element 100 within the slit 101, has a thickness, which is defined by a distance designated as 2B, between the corresponding side of the evaporation element 100 and the inner surface 103 of the slit 101. This distance is maintained by a series of vertical ribs 102 protruding a distance 2B from the inner surface 103 of the slit 101, as illustrated in FIG. 10B.

In the above arrangement, a mass flow rate, ṁ, down through the flow channel obtained on each side of the evaporation element 100 is governed by the equation for laminar flow in a slit given by:

$$\dot{m} = \frac{2\Delta P(W - nw_r)\rho B^3}{3\mu L}$$

where:
ΔP is given by ρg(L+a), where L is the length of the flow channel, a is the height of mineral solution above the flow channel, ρ is the density of the mineral solution and g is the gravity force,
B is the half thickness of the flow channel on each side of the evaporation element,
W is the width of the flow channel,
n is the number of vertical ribs 102 of the slit wall 103,
$w_r$ is the width of each vertical rib in the slit wall, and
μ is the viscosity of the mineral solution.

FIG. 11 illustrates one example of a manner, in which the evaporation element 100 can be fixed with respect to the feed trough 104 by means of a support structure including two vertical structural elements 107 configured for attaching thereto the evaporation element 100 along its side edges, and two horizontal structural elements 108 configured for attaching thereto the evaporation element along its top and bottom edges. Only one of the horizontal structural elements 108 is shown in FIG. 11, i.e. the one to which the bottom of the evaporation element is attached, whilst the other horizontal element (not shown) can be disposed within or above the trough 104.

In this example, the evaporation element 100 is formed along its side, top and bottom edges with reinforced eyelets 105, and the structural elements are formed with corresponding perforations. The eyelets 105 can be formed directly in the body of the evaporation element 100 or can be provided by attaching to this body, along each edge thereof, a strip of material other than that of the evaporation element, in which the eyelets 105 are formed.

With the above arrangement, the evaporation element 100 is fixed to the structural elements 107 and 108 by connecting its eyelets 105 and the corresponding perforations in the structural elements 107 and 108 using loops 106 made of a non-extendible material that is strong enough to withstand the operational conditions of the evaporation element. For example, this material can be in the form of cords, wires or ropes. Alternatively for top and bottom edges of evaporation element 100 can each have a sleeve of strong fabric extending therealong and configured to receive therein the horizontal structural elements 108.

In the above described example, when the evaporation element 100 is fixed to the support structure 107, 108, its upper portion can protrude upwardly from the slit 101 into the trough 104 if one of the horizontal structural elements 108 is disposed within or above the trough, or it can pass through the trough and protrude upwardly therefrom, if the corresponding horizontal element 108 is mounted above the trough and is spaced therefrom. Alternatively, the loops 106 connecting the upper portion of the evaporation element 100 with the corresponding horizontal structural element 108 (not shown) can protrude from the upper portion of the evaporation element into the trough 104 if one of the horizontal structural elements 108 is disposed within or above the trough, or can protrude upwardly from the trough 104, if the corresponding horizontal element 108 is mounted above the trough.

The invention claimed is:

1. A process for production of minerals, the process comprising:
providing an evaporation element for exposing thereof to an atmosphere for evaporation of a liquid solution therefrom, the evaporation element including an evaporation surface oriented for allowing movement of the liquid solution therealong under influence of gravity and having a texture configured for deflecting the liquid solution during the movement along the evaporation surface, leaving minerals on the evaporation surface produced as a result of evaporation of the liquid solution, and further configured for allowing the minerals to detach from the evaporation element under the sole influence of gravity and/or winds of up to 60 km/h, before the minerals on the evaporation element reach a weight capable of damaging the evaporation element;
mounting the evaporation element so that the evaporation surface forms an angle between 0 to 30 degrees with an imaginary vertical axis;
wetting the evaporation element with the liquid solution, which at least partially evaporates and forms precipitated minerals, at least some of which are left on the evaporation surface; and
letting the minerals detach from the evaporation surface solely under the sole influence of gravity and/or winds of up to 60 km/h, before the minerals on the evaporation surface reach a weight capable of damaging the evaporation element.

2. The process of claim 1, further comprising collecting at least some of the precipitated minerals.

3. The process of claim 2, wherein the precipitated minerals collected have detached from the evaporation surface.

4. The process of claim 2, wherein the precipitated minerals collected were not left on the evaporation surface.

5. The process of claim 2, wherein collecting at least some of the precipitated minerals includes collecting all precipitated minerals.

6. The process of claim 1, further comprising collecting the liquid solution that has not evaporated.

7. The process of claim 6, further including collecting any precipitated minerals that are in the liquid solution that has not evaporated.

8. The process of claim 1, wherein the texture of the evaporation surface is rough or irregular or comprises a pattern or comprises projections extending in a direction away from the surface or is formed with grooves or is formed with facets.

9. The process of claim 1, wherein the evaporation surface is wettable by liquid.

10. The process of claim 1, wherein the evaporation surface is wettable by liquid by adsorbing hydrophilic polymers onto the evaporation surface or by chemically grafting hydrophilic groups on the evaporation surface.

11. The process of claim 1, wherein the evaporation surface is hydrophilic.

12. The process of claim 1, wherein the texture of the evaporation surface is free of an anchoring configuration.

13. The process of claim 1, wherein the texture of the evaporation surface has a majority thereof free of pores, or is formed only with pores that are spaced at least 10 cm apart from each other, or is free of undercuts.

14. The process of claim 1, wherein the texture of the evaporation surface is free of through holes.

15. The process of claim 1, wherein the evaporation surface of the evaporation element and/or the evaporation element is made of at least one material selected from the group consisting of polyolefins, high density polyethylene, polypropylene, halogenated aliphatics, PVDF, PVC, polyacetate, ABS, PPO, fiberglass, Polyether ether ketone (PEEK), and nylon.

16. The process of claim 1, wherein the evaporation element is substantially rigid.

17. The process of claim 1, wherein the evaporation element is a building block of an evaporation unit configured to bear the load of other evaporation elements.

18. The process of claim 1, wherein the evaporation element is free of depressions extending from the evaporation surface into interior of the evaporation element, which have within the interior a larger linear dimension parallel to the evaporation surface than their corresponding dimension at the evaporation surface.

19. The process of claim 1, further including providing a liquid solution reservoir with a slit at a bottom thereof, configured to receive therein an upper portion of the evaporation element, the evaporation element having two substantially parallel surfaces and the slit having substantially parallel walls formed with periodically spaced vertical ribs, the ribs being configured to be in such close proximity to the evaporation surfaces of the evaporation element as to keep constant a distance between the evaporation element and the walls of the slit at those areas of the walls that are free of said ribs, defining thereby a flow channel on each side of evaporation element.

20. An evaporation unit, comprising:
an evaporation element for exposing thereof to an atmosphere for evaporation of a liquid solution therefrom, the evaporation element including:
an evaporation surface oriented for allowing movement of the liquid solution therealong under the influence of gravity, the evaporation surface having a texture which is free of an anchoring configuration and which is configured for deflecting the liquid solution during the movement along the evaporation surface, leaving minerals on the evaporation surface produced as a result of evaporation of the liquid solution, the texture of the evaporation surface further configured for allowing the minerals to detach from the evaporation element under the sole influence of gravity and/or winds of up to 60 km/h, before the minerals on the evaporation element reach a weight capable of damaging the evaporation unit; and a mounting arrangement for mounting the evaporation element so that the evaporation surface forms an angle between 0 to 30 degrees with an imaginary vertical axis.

* * * * *